(12) United States Patent
Niiya

(10) Patent No.: US 8,144,291 B2
(45) Date of Patent: Mar. 27, 2012

(54) DISPLAY DEVICE AND PRODUCTION METHOD THEREOF

(75) Inventor: Hirotaka Niiya, Nishio (JP)

(73) Assignee: Sharp Kabushiki Kaisha, Osaka (JP)

( * ) Notice: Subject to any disclaimer, the term of this patent is extended or adjusted under 35 U.S.C. 154(b) by 213 days.

(21) Appl. No.: 12/374,232

(22) PCT Filed: Mar. 26, 2007

(86) PCT No.: PCT/JP2007/056213
§ 371 (c)(1),
(2), (4) Date: Jan. 16, 2009

(87) PCT Pub. No.: WO2008/010332
PCT Pub. Date: Jan. 24, 2008

(65) Prior Publication Data
US 2009/0316088 A1    Dec. 24, 2009

(30) Foreign Application Priority Data
Jul. 20, 2006    (JP) ................................ 2006-198467

(51) Int. Cl.
*G02F 1/1335* (2006.01)
(52) U.S. Cl. ........................................ 349/106; 349/144
(58) Field of Classification Search ........................ None
See application file for complete search history.

(56) References Cited

U.S. PATENT DOCUMENTS

| | | | |
|---|---|---|---|
| 5,670,205 A * | 9/1997 | Miyazaki et al. | |
| 6,307,606 B1 * | 10/2001 | Takii et al. | |
| 7,573,548 B2 * | 8/2009 | Yang et al. | 349/106 |
| 7,826,027 B2 * | 11/2010 | Sawasaki et al. | 349/156 |
| 2001/0000437 A1 * | 4/2001 | Tanaka et al. | 349/110 |
| 2003/0227429 A1 * | 12/2003 | Shimoshikiryo | |
| 2004/0070713 A1 * | 4/2004 | Song | |
| 2004/0130253 A1 * | 7/2004 | Ohsaki et al. | 313/110 |
| 2004/0233367 A1 * | 11/2004 | Kim et al. | 349/139 |
| 2005/0122457 A1 * | 6/2005 | Song | 349/129 |
| 2005/0213015 A1 * | 9/2005 | Shimoshikiryo | |
| 2006/0008930 A1 * | 1/2006 | Toyoda et al. | |
| 2006/0028589 A1 * | 2/2006 | Um et al. | |
| 2006/0256271 A1 * | 11/2006 | Shimoshikiryo | |
| 2007/0285589 A1 * | 12/2007 | Song | |

FOREIGN PATENT DOCUMENTS

EP    0 675 385 A1 * 10/1995

(Continued)

*Primary Examiner* — Thanh-Nhan Nguyen
(74) *Attorney, Agent, or Firm* — Birch, Stewart, Kolasch & Birch, LLP

(57) ABSTRACT

A display device includes an active matrix substrate and a color filter substrate facing each other, wherein the active matrix substrate includes a scanning line, a signal line, and a switching element, and has a pixel, the switching element being arranged at an intersection of the scanning line and the signal line, the pixel including two sub-pixels, the two sub-pixels being arranged with the scanning line or the signal line therebetween, the color filter substrate includes a bank and a plurality of colored layers surrounded by the bank, the bank being arranged in regions overlapping with the signal line, and the switching element, and the plurality of colored layers include the first colored layer and the second colored layer, the first colored layer overlapping with one sub-pixel positioned at an end and a region outside a sub-pixel-arranged region, and the second colored layer overlapping with two sub-pixels.

7 Claims, 3 Drawing Sheets

FOREIGN PATENT DOCUMENTS

| | | | |
|---|---|---|---|
| EP | 1 624 332 A1 | * | 2/2006 |
| EP | 1 860 489 A1 | * | 11/2007 |
| JP | 7-318723 A | * | 12/1995 |
| JP | 8-179341 A | * | 7/1996 |
| JP | 2000-352939 A | * | 12/2000 |
| JP | 2004-38165 A | * | 2/2004 |
| JP | 2004-62146 A | * | 2/2004 |
| JP | 2006-23462 A | * | 1/2006 |
| JP | 2006-48055 A | * | 2/2006 |

* cited by examiner (a) (b)

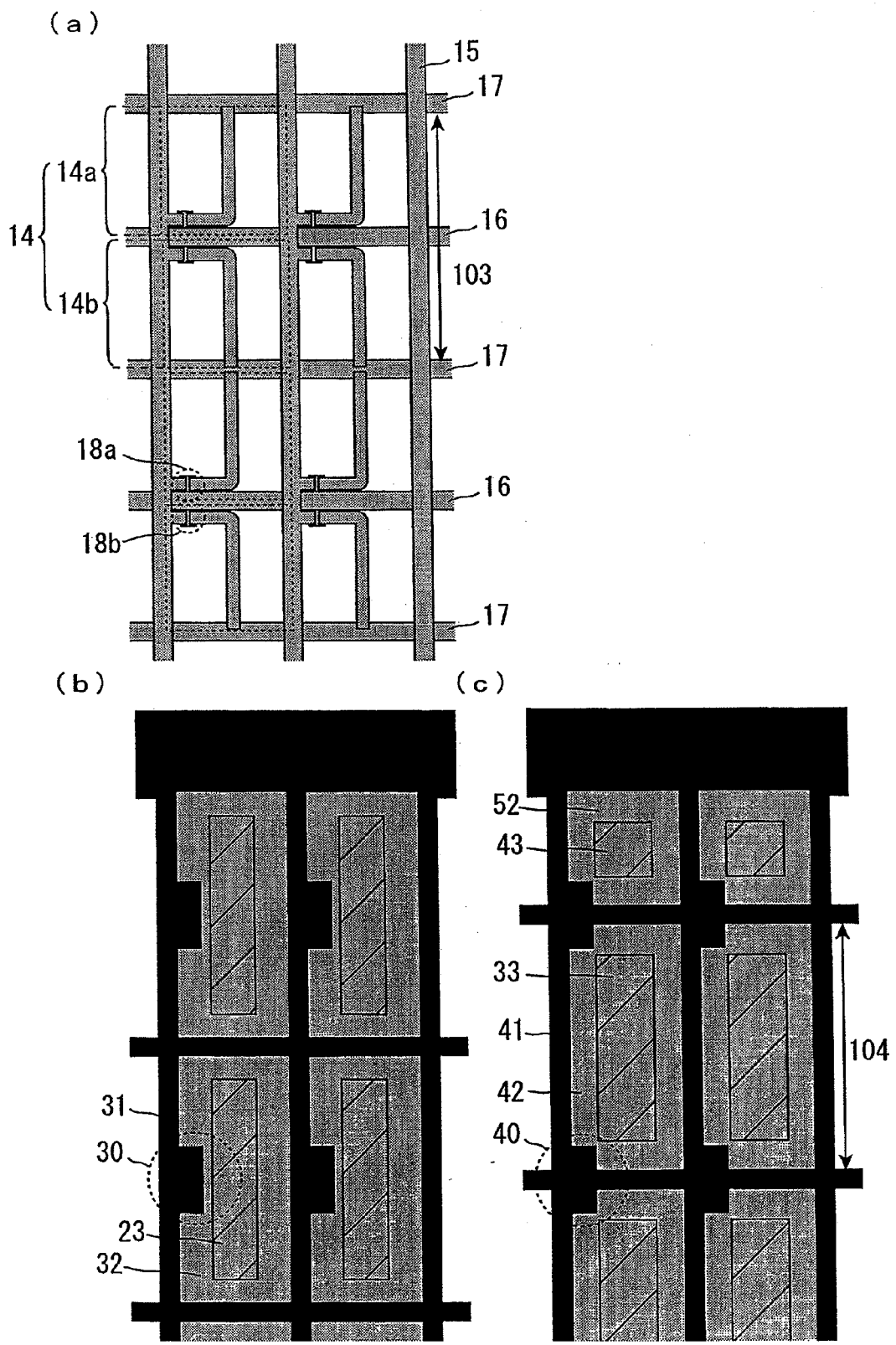

DISPLAY DEVICE AND PRODUCTION METHOD THEREOF

BACKGROUND OF THE INVENTION

1 Field of the Invention

The present invention relates to a display device and a production method thereof. More specifically, the present invention relates to a display device such as a liquid crystal display device, which provides color display using colored layers formed by a method of applying a droplet, such as an inkjet method, and to a production method of such a display device.

2 Description of the Related Art

In display devices such as a liquid crystal display device, various contrivances have been introduced to prevent a reduction in contrast ratio, a change in color tone, darkening of display gradation, and the like when a screen is viewed in an oblique direction. Further, the following problem has been recently pointed out. A difference in gradation level of display luminance between when the screen is viewed in the front direction and when it is viewed in an oblique direction causes a difference in display state depending on an observation direction, and further, such a difference also influences on display of images such as a photograph or TV screen display. Improvements in such a point have been desired. Under such a circumstance, for example, a method of enhancing display qualities by dividing each pixel formed on a thin film transistor (TFT) array substrate into plural regions, and applying a voltage to each region, thereby adjusting a gradation level of display luminance (for example, refer to Patent Document 1).

A color filter (hereinafter, also referred to as a CF) used in the liquid crystal display device and the like generally has a structure in which colored layers (filters) of three primary colors of light, i.e., red (R), green (G), and blue (B), are formed on a transparent substrate. The following methods are commonly used as a production method of the CF substrate: a pigment dispersion method of applying a color resist on a transparent substrate, exposing and developing the resist, thereby pattern-forming a colored layer; a dyeing method of applying a dyeing base material on a transparent substrate, dyeing a pattern formed by exposing and developing the material to form a colored layer; an electrodeposition method of pattern-forming a transparent electrode on a transparent substrate, applying a current to the transparent electrode in an electrolyte of each color, thereby forming a colored layer by electrodeposition; and a printing method of printing each color on a transparent substrate, thereby forming a colored layer. However, according to the pigment dispersion method and the dyeing method, the respective steps of coating, exposure, and development need to be repeatedly performed for each color. Therefore, the processes are difficult to simplify. In addition, spin coating in the application step increases loss of materials. According to the electrodeposition method, the pattern shape is limited. Further, a high-definition pattern is difficult to form by the printing method. Therefore, an ink-jet method has attracted attention as a new alternative method of forming a colored layer.

According to the ink-jet method, an ink-jet apparatus equipped with an ink-jet head having a plurality of nozzles is used. While the ink-jet head is moved over a transparent substrate, colored materials of red (R), green (G), and blue (B) are injected to directly form a colored layer pattern. This method needs no exposure and development steps, which can simplify the processes. Further, the use amount of a material for the colored layer can be decreased. As a result, costs can be reduced.

As one method of preparing a CF substrate by an ink-jet method, a method in which a bank is formed on a glass substrate, and ink is injected into a region surrounded by the bank to form a colored layer is disclosed (for example, refer to Patent Document 2). A black matrix (hereinafter, also referred to as a BM) that is formed on the substrate can be used also as a bank. Ink is injected into a region surrounded by the BM and dried to form a colored layer.

The applied ink flows on the substrate, which possibly causes a variation in thickness of the formed colored layer. This ink flow is remarkably observed in a stripe bank pattern, but hardly observed in a dot bank pattern. If the CF substrate is prepared by an ink-jet method, inks might be mixed between adjacent pixels to cause a color mixing defect. Therefore, in order to easily correct the color mixing defect, the dot bank pattern is also better than the stripe bank pattern.

If a pixel division configuration that has been recently adopted to a liquid crystal TV and the like as a wide viewing angle technology is employed in combination with the method of producing a CF substrate by an ink-jet method, the bank structure might hinder drawing of a colored layer pattern that is formed with an ink-jet apparatus. This is mentioned in more detail below with reference to FIG. 3. FIG. 3 is a planar view schematically showing each substrate of a display device in accordance with the pixel division configuration. FIG. 3(a) shows a TFT substrate. FIG. 3(b) shows a CF substrate in which a CF is divided along a storage capacitor wiring. FIG. 3(c) shows a CF substrate in which a CF is divided along a scanning line.

As shown in FIG. 3(a), a plurality of signal lines 15 and a plurality of scanning lines 16 are arranged to be perpendicular to each other on the TFT substrate. In addition, a storage capacitor wiring 17 is arranged between the scanning lines 16 to be perpendicular to the signal lines 15 and parallel to the scanning lines 16. At each intersection of the signal lines 15 and the scanning lines 16, two TFTs 18a and 18b that are switching elements are arranged with the scanning line 16 therebetween. These two TFTs 18a and 18b are arranged in a pixel 14 that is an image display unit controlled by the signal line 15 and the scanning line 16 to divide the pixel 14 into two sub-pixels 14a and 14b and control them.

Two configurations shown in FIGS. 3(b) and 3(c) are mentioned as a configuration of the CF substrate that makes a pair with the TFT substrate shown in FIG. 3(a). First, in FIG. 3(b), a bank 31 is arranged in regions overlapping with the signal line 15, the storage capacitor wiring 17, and the TFTs 18a and 18b. The TFTs 18a and 18b are arranged with the scanning line 16 therebetween. Therefore, the bank 31 has a TFT shielding part 30 that expands from a region other than the corner. When ink is injected into a coloring region by an ink-jet method, in order to prevent color mixing between adjacent coloring regions or prevent the ink from being spread on the bank, a margin of ink injection needs to be secured by setting a position where the ink is injected to be separated from the bank 31 by a certain distance (30 μm or more if a common ink-jet apparatus and common ink are used). Accordingly, if an ink-injected region 23 is formed in such a way that ink is not injected on the TFT shielding part 30, the ink-injected region 23 is too small. In such a case, a moving speed of the ink-jet head needs to be decreased or the ink needs to be injected several times, for injecting droplets in a required amount. As a result, production efficiency of the colored layer 32 is reduced. Even if droplets in a required amount are injected, the ink is difficult to spread into the vicinity a hem of the TFT shielding part 30, and the ink is not uniformly spread. As a result, a phenomenon in which the absence of the colored layer 32 or insufficient thickness of the colored layer 32 causes insufficient coloring of transmissive light, a so-called void phenomenon might be generated near the TFT shielding part 30.

In FIG. 3(c), a bank 41 is arranged in regions overlapping with the signal line 15, the scanning line 16, and the TFTs 18a and 18b. That is, the bank 41 is arranged not in the region overlapping with the storage capacitor wiring 17 but in the region overlapping with the scanning line 16. According to such a structure, a TFT shielding part 40 is arranged at a corner of the coloring region, and therefore, generation of the above-mentioned void phenomenon can be suppressed. However, a pixel formation period 103 in the TFT substrate is different from a colored layer formation period 104 in the CF substrate by one sub-pixel. Therefore, an area of a coloring region 52 positioned at an end of the display region is half that of a coloring region 42 in the display region. Even in the coloring region 52, the above-mentioned margin of ink injection needs to be provided, and therefore, a region where ink can be actually injected is further decreased. Therefore, an area of a region 43 where ink can be injected in the coloring region 52 is half or smaller than that of a region 33 where ink can be injected in the coloring region 42 in the display region. Therefore, it takes a long time to complete the ink injection, which leads to a reduction in production efficiency of the colored layers. Accordingly, there is room for improvement in this point.

[Patent Document 1]
Japanese Kokai Publication No. 2004-62146
[Patent Document 2]
Japanese Kokai Publication No. Hei-07-318723

SUMMARY OF THE INVENTION

The present invention has been made in view of the above-mentioned state of the art. The present invention has an object to provide a display device excellent in productivity, in which colored layers can be uniformly formed on a CF substrate by a method of applying a droplet, such as an ink-jet method, even if a TFT substrate has the pixel division configuration, and to provide a production method of such a display device.

The present inventor made various investigations on a display device with excellent productivity, in which colored layers can be uniformly formed on a CF substrate by an ink-jet method even if a TFT substrate has the pixel division configuration. The inventor noted a shape of a colored layer at an end of a display region and found the followings. If a display region of the TFT substrate having a pixel division configuration and colored layers of the CF substrate are arranged to face each other in a conventional manner, an overhanging part for TFT shielding is arranged in a region other than a corner of a bank on the CF substrate, as shown in FIG. 3(b), or a colored layer at an end of the display region is small as shown in FIG. 3(c). Then, the inventor found that if at least one colored layer at the end of the display region overlaps with one sub-pixel and a region where no pixel is arranged and colored layers other than the at least one colored layer overlap with two sub-pixels, ink can be uniformly spread into the coloring region when the ink is injected. As a result, the above-mentioned problems have been admirably solved, leading to completion of the present invention.

That is, the present invention is a display device including an active matrix substrate and a color filter substrate facing each other, wherein the active matrix substrate includes a scanning line, a signal line, and a switching element, and has a pixel, the switching element being arranged at an intersection of the scanning line and the signal line, the pixel including two sub-pixels, the two sub-pixel being arranged with the scanning line or the signal line therebetween, the color filter substrate includes a bank and a plurality of colored layers surrounded by the bank, the bank being arranged in regions overlapping with the scanning line, the signal line, and the switching element, and the plurality of colored layers include the first colored layer and the second colored layer, the first colored layer overlapping with one sub-pixel positioned at an end and a region outside a sub-pixel-arranged region, the second colored layer overlapping with two sub-pixels (hereinafter, also referred to as the first display device).

The present invention is mentioned below.

The first display device of the present invention includes an active matrix substrate and a color filter substrate facing each other. The active matrix substrate is not especially limited as long as it includes a scanning line, a signal line, and a switching element arranged at an intersection of such lines. For example, the active matrix substrate has a configuration in which conductive members such as a scanning line, a signal line, and a pixel electrode and insulating films such as a gate insulating film and an interlayer insulating film are alternately stacked on a glass, resin, and the like, substrate. A TFT and the like can be used as the switching element, for example. The scanning line is connected to a gate electrode of the TFT, and ON/OFF of the TFT is controlled by a scanning signal input into the gate electrode. The signal line is connected to a source electrode of the TFT, and when the TFT is in an ON-state, a signal voltage is applied to the pixel electrode through the source and drain electrodes of the TFT. Thus, the TFT drives and controls the pixel electrode.

The active matrix substrate in the first display device includes a pixel composed of two sub-pixels. The two sub-pixels are arranged with the scanning line or the signal line therebetween. If the active matrix substrate has such a pixel division configuration, the sub-pixels into which one pixel is divided can be individually driven. Therefore, gradation dependency of display luminance, i.e., a difference in display luminance between when display is viewed in the front direction and when display is viewed in an oblique direction can be improved. In the present description, the term "sub-pixel" means the minimum driving unit individually controlled by the switching element. The sub-pixel is each individually provided with an electrode.

The color filter substrate in the first display device includes a bank and a plurality of colored layers surrounded by the bank. The bank is arranged in regions overlapping with the scanning line, the signal line, and the switching element. The bank means a projective structure that is formed to surround the plurality of colored layers. The scanning line and the signal line are generally arranged to be perpendicular to each other. The bank arranged in the regions overlapping with the scanning line and the signal line has a substantially lattice shape. The colored layers surrounded by the bank are arranged in a dot pattern. The material for the bank is not especially limited, and a photosensitive resin material and the like can be used, for example. From viewpoints of operation and effects of the present invention, a material that is prepared by solidifying a liquid material is preferable as a material for the colored layer. If the colored layer is formed by an ink-jet method, ink that can be injected by an ink-jet apparatus is used. The number of colors of the colored layers is not especially limited, and it may be three or four or more. If three colors are employed, a combination of three primary colors of light, i.e., red (R), green (G), and blue (B), a combination of yellow, cyan, and magenta, and the like, are mentioned.

The plurality of the colored layers in the first display device include the first colored layer and the second colored layer. The first colored layer overlaps with one sub-pixel positioned at an end and a region outside a sub-pixel-arranged region. The second colored layer overlaps with two sub-pixels. Accordingly, the first colored layer that is positioned at at least part of the end of the sub-pixel-arranged region (also, referred to as a display region) overlaps with one sub-pixel and a region where no pixel is arranged. Further, the second colored layer that is formed at other parts of the sub-pixel-arranged region overlaps with two sub-pixels. Thus, according to the color filter substrate in the display device of the present invention, some colored layers are arranged outside the region facing the sub-pixel-arranged region of the active matrix substrate.

In an active matrix substrate in accordance with the pixel division configuration, two sub-pixels adjacent with a scanning line therebetween or two sub-pixels adjacent with a signal line therebetween constitute one pixel. If a bank is arranged in regions overlapping with the signal line and the scanning line, a colored layer surrounded by the bank overlaps with one pixel, that is, two sub-pixels. However, a pixel formation period is different from a colored layer formation period by one sub-pixel, and therefore, at an end of a display region, a colored layer corresponding to just one sub-pixel is left. However, according to the present invention, the colored layer at the end of the display region overlaps with one sub-pixel and the region where no pixel is arranged. Therefore, the ink-injected region does not need to be small. As a result, the productivity of the CF substrate is improved.

The first colored layer overlaps with a non-display region adjacent to the end of the display region. The size of the first colored layer is not especially limited unless uniformity of a thickness distribution of the colored layers is influenced, that is, as long as a thickness distribution of the first colored layer and that of the second colored layer can be substantially the same. It is preferable that the first colored layer is 1.5 times or less as large as the second colored layer formed in the display region.

The direction where the pixel is divided may be either an extension direction of the scanning line or an extension direction of the signal line. The pixel is generally divided along the extension direction of the scanning line. The following embodiments may be mentioned as an embodiment of the first colored layer: an embodiment in which the first colored layer is a colored layer group positioned between two sides parallel to the scanning line or a colored layer group positioned between two sides parallel to the signal line, among colored layer groups positioned in the periphery of the display region. The embodiment in which the first colored layer is a colored layer group positioned between two sides parallel to the scanning line is preferable.

The configuration of the display device of the present invention is not especially limited as long as it essentially includes the above-mentioned active matrix substrate and the above-mentioned color filter substrate. The display device may or may not include other components. The display device of the present invention is not especially limited as long as it is a display device including the active matrix substrate and the color filter substrate, but preferably, it is a liquid crystal display device.

Preferable embodiments of the display device of the present invention are mentioned below in more detail.

It is preferable that the first colored layer and the second colored layer have substantially the same area. That is, if the plurality of colored layers have substantially the same area, the colored layers can be formed without varying settings of the ink injection, which leads to an improvement in productivity.

It is preferable that in the active matrix substrate, a part overlapping with the first colored layer outside the sub-pixel-arranged region is light-shielded. The region outside the sub-pixel-arranged region does not serve as the pixel, and therefore, at least the part overlapping with the first colored layer is formed to have a structure with no transparency, and thereby, a contrast ratio can be improved. As a method of arranging such a light-shielding region, a method of forming a light-shielding metal film may be mentioned, for example.

It is preferable that the bank is a light-shielding member. For example, it is preferable that a photosensitive resin containing a black pigment and the like is used as a material for the bank. According to this embodiment, the bank can prevent light leakage from a part that has no contributions to display, thereby securing a contrast ratio, simultaneously with serving as a bank for surrounding the colored layer.

It is preferable that the bank includes an overhanging part overlapping with the switching element, the overhanging part being arranged at a corner of the bank. The region where the switching element is formed is not included in the display region. Therefore, in a region overlapping with such a region, the CF substrate is provided with the light-shielding member. The overhanging part of the bank is generally formed to project from the region overlapping with the scanning line and the signal line. The corner of the bank means a corner of the region surrounded by the bank. The presence of the overhanging part at the corner of the bank makes it possible for ink to be uniformly spread in the region surrounded by the bank when the colored layers are formed. Therefore, high-quality colored layers that cause no void phenomenon can be formed. As a result, ink can be uniformly injected. A plurality of the overhanging parts of the bank may he arranged as long as they are arranged at the corner. The shape of the overhanging part is not especially limited, but preferably, the overhanging part covers the switching element.

It is preferable that the active matrix substrate includes a storage capacitor wiring between the pixels. A space between the pixels is not used for display, and therefore, a reduction in aperture ratio, due to the storage capacitor wiring, can be suppressed. The storage capacitor wiring may be arranged between the signal lines in parallel thereto, but generally arranged between the scanning lines in parallel thereto. The storage capacitor wiring may partly overlap with the pixel as long as the wiring is arranged between the pixels.

The present invention is also a display device including an active matrix substrate and a color filter substrate facing each other, wherein the active matrix substrate includes a scanning line, a signal line, and a switching element, and has a pixel, the switching element being arranged at an intersection of the scanning line and the signal line, the pixel including two sub-pixels, the two sub-pixels being arranged with the scanning line or the signal line therebetween, the color filter substrate includes a bank and a plurality of colored layers surrounded by the bank, the bank being arranged in regions overlapping with the scanning line, the signal line, and the switching element, and the plurality of colored layers include the first colored layer and the second colored layer, the first colored layer overlapping with three sub-pixels positioned at an end, the second colored layer overlapping with two sub-pixels (hereinafter, also referred to as the second display device)

According to the second display device of the present invention, the first colored layer positioned at the end overlaps with three sub-pixels. Therefore, the first colored layer is larger than the second colored layer that overlaps with two sub-pixels. That is, the first colored layer positioned at the end has an area substantially 1.5 times larger than that of the second colored layer. Thus, in the case that the first colored layer positioned at the end has a larger area, ink can be uniformly injected even if the overhanging part is formed in the center of the region surrounded by the bank. As a result, high-quality colored layers that cause no void phenomenon can be formed in the coloring region even at the end of the display region.

According to the second display device of the present invention, it is preferable that the bank is a light-shielding member, similarly to the first display device. Further, it is preferable that the bank includes an overhanging part overlapping with the switching element, the overhanging part being arranged at a corner of the bank and at a boundary between two sub-pixels positioned at an end, of the bank.

According to the above-mentioned embodiment, ink can be uniformly spread into the region surrounded by the bank even if the bank includes the overhanging part that overlaps with the switching element. As a preferable embodiment of the above-mentioned active matrix substrate, an embodiment in which a storage capacitor wiring is formed between the pixels is mentioned, similarly to the first display device.

The present invention is a production method of the first or second display device, wherein the plurality of colored layers are formed by an ink-jet method. The first or second display device of the present invention has a structure suitable for the colored layer to be formed by the ink-jet method. According to the first and second display devices, the bank is formed in a substantially lattice pattern in the regions overlapping with the scanning line and the signal line. Therefore, the coloring region surrounded by the bank has a structure capable of suppressing ink flow. In the first display device, the first colored layer at the end of the display region overlaps with one sub-pixel, and also overlaps with the region where no pixel is formed. Therefore, a region where ink is injected is sufficiently secured in each of the first and second colored layers. Also in the second display device, the region where ink is injected is sufficiently secured in each of the first and second colored layers because the first colored layer at the end of the display region overlaps with three sub-pixels.

EFFECT OF THE INVENTION

According to the first or second display device of the present invention, the active matrix substrate has a pixel division configuration. Therefore, the phenomenon in which gradation dependency of display luminance is different between when the display is viewed in the front direction and when the display is viewed in an oblique direction is resolved. In addition, despite the pixel division configuration, the CF substrate can be produced by an ink-jet method without reducing the productivity, and high-quality colored layers having a uniform thickness distribution can be formed.

BRIEF DESCRIPTION OF THE DRAWINGS

FIG. 1(a) shows the TFT substrate. FIG. 1(b) shows the CF substrate.

FIG. 3 is a planar view schematically showing the substrate in the conventional display device in accordance with the pixel division configuration. FIG. 3(a) shows the TFT substrate. FIG. 3(b) shows the CF substrate in which the CF is divided along the storage capacitor wiring. FIG. 3(c) shows the CF substrate in which the CF is divided along the scanning line.

DETAILED DESCRIPTION OF THE INVENTION

The present invention is mentioned in more detail below with reference to Embodiments using drawings, but not limited to only these Embodiments.

"Embodiment 1"

Figure 1:
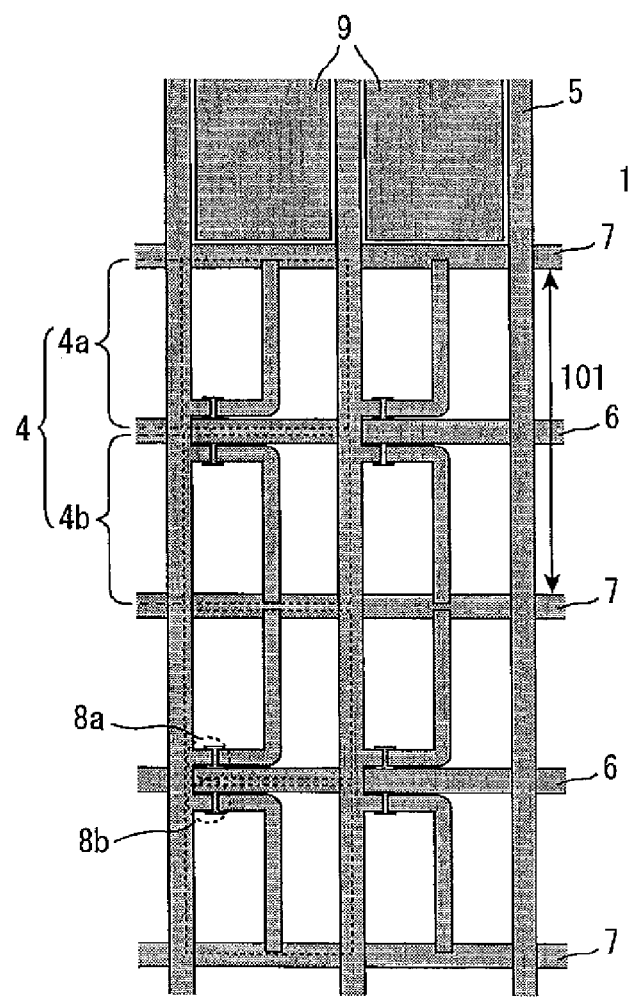
FIG. 1 is a planar view schematically showing the substrate in the display device in accordance with Embodiment 1.
Figure 1:
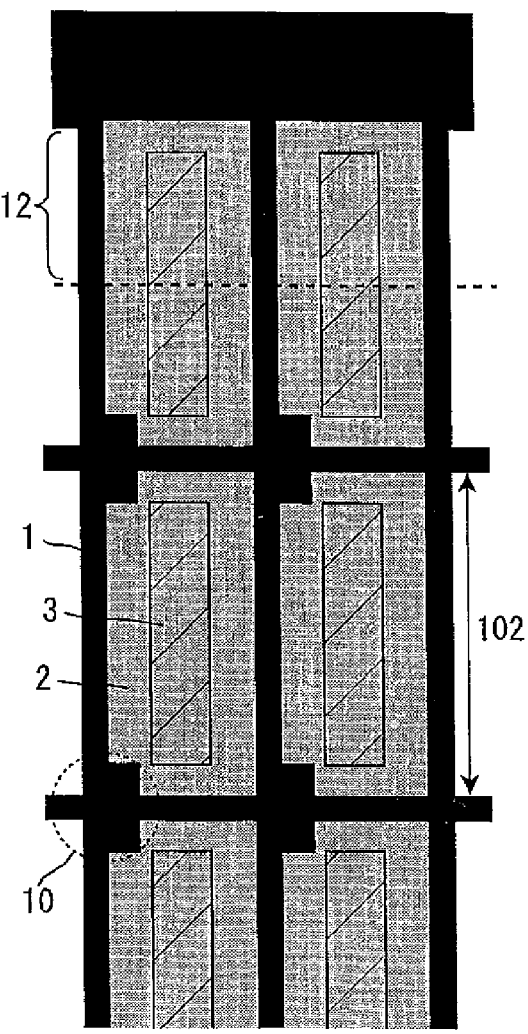

A display device in accordance with Embodiment 1 includes a TFT substrate (active matrix substrate) and a CF substrate facing each other. FIG. 1 is a planar view schematically showing each substrate in the display device in accordance with Embodiment 1. FIG. 1(a) shows the TFT substrate. FIG. 1(b) shows the CF substrate. The display device in Embodiment 1 further includes components which a common liquid crystal display has, as well as the TFT substrate and the CF substrate. For example, a liquid crystal layer is arranged between the TFT substrate and the CF substrate facing each other. On the sides opposite to the liquid crystal layer of the both substrates, a polarizer and various optical films and the like are arranged. A backlight is also arranged if the display device is a transmissive or transflective liquid crystal display device.

As shown in FIG. 1(a), a plurality of signal lines 5 and a plurality of scanning lines 6 are arranged on the TFT substrate to be perpendicular to each other. At an intersection of the signal lines 5 and the scanning lines 6, two TFTs (switching elements) 8a and 8b are arranged with the scanning line 6 therebetween. These two TFTs 8a and 8b are arranged in a pixel 4 controlled by the signal line 5 and the scanning line 6 to divide the pixel 4 into two sub-pixels 4a and 4b and control them. In addition, a storage capacitor wiring 7 is arranged between the pixels, and it extends between the scanning lines 6 to be perpendicular to the signal lines 5 and parallel to the scanning lines 6.

Further, as shown in FIG. 1(b), the CF substrate is provided with a bank 1 which has shielding property and also serves as a black matrix. The bank 1 is arranged in a dot matrix pattern to overlap with the signal lines 5 and the scanning lines 6 on the TFT substrate shown in FIG. 1(a). Further, a plurality of colored layers 2 are arranged in regions surrounded by the bank 1 on the CF substrate. As shown in FIG. 1(b), an overhanging part 10 of the bank 1 is arranged to overlap with the TFT 8a and 8b when the TFT substrate is attached to the CF substrate, that is, arranged at a corner of the bank 1. The overhanging part 10 is formed to have a square shape in FIG. 1(b), but not limited to this shape.

The colored layers 2 are formed by injecting ink into the region surrounded by the bank 1, by an ink-jet method. According to the structure in Embodiment 1, the coloring regions where the colored layer 2 is to be formed are formed in a dot matrix pattern. Therefore, the ink is uniformly spread from an ink-injected region 3 inside the coloring region to the entire coloring region. Therefore, the colored layers 2 can be formed to have high qualities and a uniform thickness distribution.

According to Embodiment 1, a pixel formation period 101 in the TFT substrate and a colored layer formation period 102 in the CF substrate are different by one sub-pixel. As measures against this difference in the period, a dummy colored layer 12 corresponding to one sub-pixel is arranged at the end of a display region (sub-pixel-arranged region). That is, according to Embodiment 1, the colored layers 2 include the first colored layer and the second colored layer. The first colored layer (including the dummy colored layer 12 as a part) is positioned at the end of the display region, and overlaps with one sub-pixel and a region outside the display region. The second colored layer overlaps with two sub-pixels. According to such a configuration, the colored layers 2 have substantially the same area. Therefore, an efficiency of the ink-applying step is significantly improved.

In Embodiment 1, light leakage is prevented by arranging a dummy metal pattern 9 for light shielding, as shown in FIG. 1(a), in a region not overlapping with the sub-pixels 4a and 4b of the colored layers 2 positioned at an end of the display region, that is, in a region which is adjacent to the sub-pixels 4a and 4b and includes no pixels.

The display device in Embodiment 1 can be produced by a common method that can be employed for producing a liquid crystal display device. Production methods of the CF substrate and the TFT substrate are partly mentioned below.

"Production Method of CF Substrate"

A photosensitive resin material containing a black pigment is applied on a glass substrate, first. Then, the applied material is exposed and developed to give a bank 1. The bank 1 has a pattern (shape as viewed in plane) that overlaps with the signal lines 5 and the scanning lines 6 on the TFT substrate and can form the dummy colored layer 12 through exposure and development treatments. Successively, the bank 1 is subjected to a surface treatment using fluorine atom-containing plasma gas, thereby providing the bank 1 surface with ink repellency. However, the substrate surface was not substituted with the fluorine atom, and therefore, it has ink-affinity in comparison to the bank 1. Then, a color dispersion liquid into which a pigment has been dispersed is injected into the region surrounded by the bank 1 with an ink-jet apparatus, and the colored layer 2 is formed by solidifying the injected liquid. Such a colored layer 2 has a TET shielding part 10 at a corner of the bank 1. However, the bank 1 has an almost rectangular pattern. Accordingly, the ink is uniformly spread into the region surrounded by the bank 1. As a result, the high-quality colored layers 2 that cause no void phenomenon are formed.

Successive steps such as formation of a common electrode are the same as in a common production method of a CF substrate.

"Production Method of TFT Substrate"

According to the TFT substrate in accordance with Embodiment 1, the dummy metal pattern 9 is formed in a region overlapping with the dummy colored layer 12 on the CF substrate. Examples of a material for the dummy metal pattern 9 include metals such as titanium, aluminum, molybdenum, chromium, and silver, and alloys of these metals. The dummy metal pattern 9 has a single layer structure or a multilayer structure. The dummy metal pattern 9 can be formed simultaneously when a metal film or an alloy film is patterned to form a source electrode and a drain electrode of the TETs 8a and 8b. Specifically, a metal film is formed by a sputtering method and patterned by photolithography, etching, and the like.

"Embodiment 2"

Figure 2:
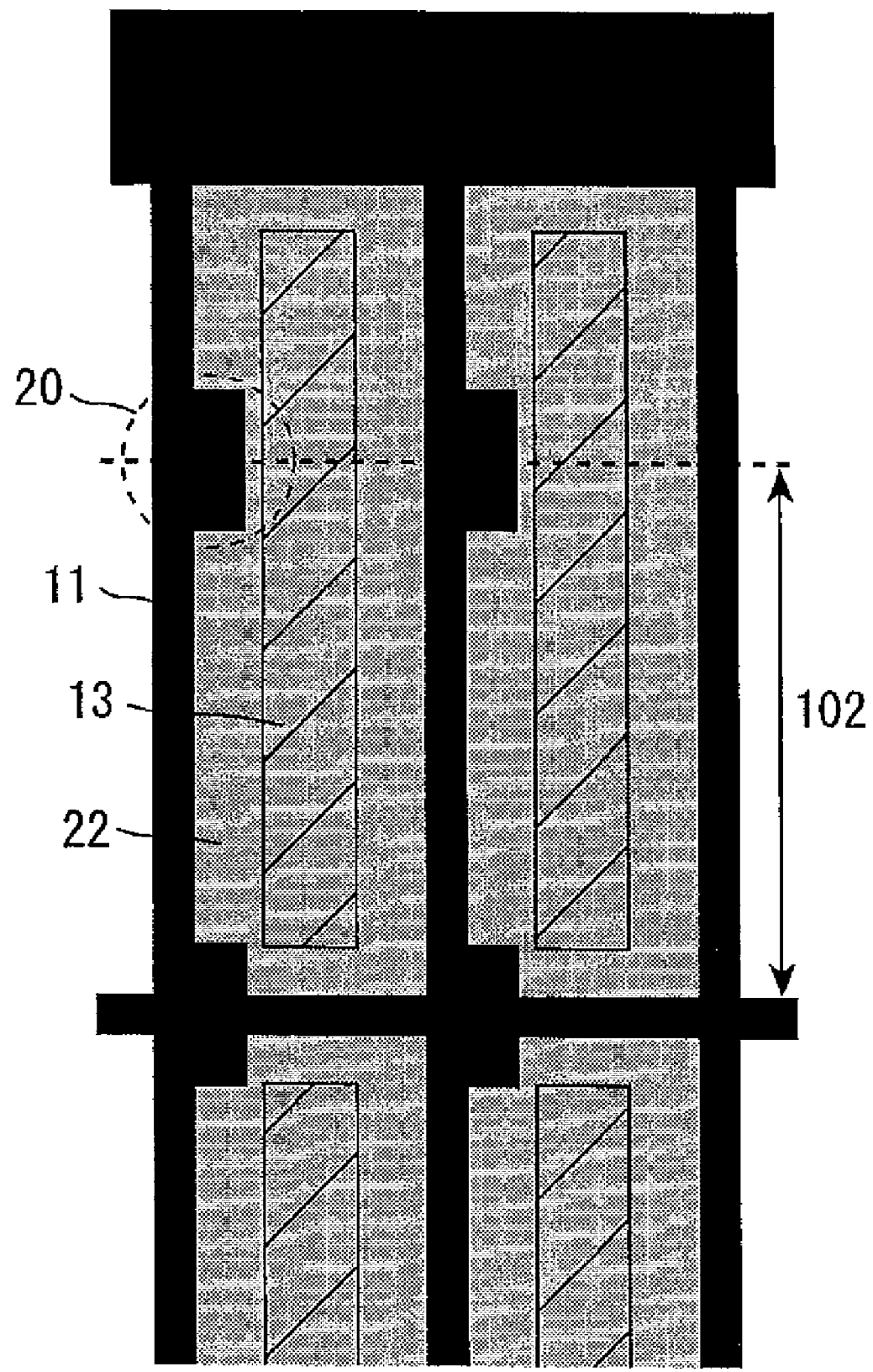
FIG. 2 is a planar view schematically showing the CF substrate in the display device in accordance with Embodiment 2.

A display device in accordance with Embodiment 2 is the same as in Embodiment 1, except that the dummy colored layer 9a and the dummy metal pattern 12 in the display device in Embodiment 1 are not arranged and that the CF substrate does not include the bank in the part overlapping with the scanning line positioned at the end of the display region. FIG. 2 is a planar view schematically showing a CF substrate of the display device in accordance with Embodiment 2. According to Embodiment 2, as measures against the difference between the pixel formation period 101 in the TFT substrate and the colored layer formation period 102 in the CF substrate, the bank is not formed in the part overlapping with the scanning line positioned at the end of the display region. As a result, a colored layer 22 positioned at the end of the display region is formed to have an area 1.5 times larger than that of another colored layer. That is, the colored layers 22 in Embodiment 2 include the first colored layer and the second colored layer. The first colored layer overlaps with three sub-pixels positioned at the end of the display region. The second colored layer overlaps with two sub-pixels. According to Embodiment 2, a TFT shielding part 20 of a bank 11 adjacent to the first colored layer is formed as a projection at a side of the bank 11 as well as at the corner of the bank 11. According to this configuration, the region where the colored layer 22 is to be formed becomes longer to extend an ink-injected region 13. Therefore, the ink is uniformly spread into a region surrounded by the bank 11. As a result, the high-quality colored layers 22 that cause no void phenomenon can be formed.

The present application claims priority under the Paris Convention and the domestic law in the country to be entered into national phase on Patent Application No. 2006-198467 filed in Japan on Jul. 20, 2006, the entire contents of which are hereby incorporated by reference.

The terms "or more" and "or less" in the present description means that the value described, i.e., boundary value is included.

The invention claimed is:

1. A display device, comprising:
an active matrix substrate and a color filter substrate facing each other,
wherein the active matrix substrate includes a scanning line, a signal line, and two different switching elements, and has a pixel,
the two different switching elements being arranged on both sides of the scanning line at an intersection of the scanning line and the signal line,
the pixel including two sub-pixels,
the two sub-pixels being arranged with the scanning line or the signal line therebetween,
the two sub-pixels are defined as regions which are controlled individually by a corresponding one of the two different switching elements,
the color filter substrate includes a bank and a plurality of colored layers surrounded by the bank,
the bank being arranged in regions overlapping with the scanning line, the signal line, and the switching element,
the plurality of colored layers include a first colored layer and a second colored layer,
the first colored layer overlapping with only one sub-pixel positioned at an end of a sub-pixel arranged region and a region outside the sub-pixel-arranged region, and
the second colored layer overlapping with two sub-pixels.

2. The display device according to claim 1, wherein the first colored layer and the second colored layer have substantially the same area.

3. The display device according to claim 1, wherein in the active matrix substrate, a part overlapping with the first colored layer outside the sub-pixel-arranged region is light-shielded.

4. The display device according to claim 1, wherein the bank is a light-shielding member.

5. The display device according to claim 1, wherein the bank includes an overhanging part overlapping with the switching element, the overhanging part being arranged at a corner of the bank.

6. The display device according to claim 1, wherein the active matrix substrate includes a storage capacitor wiring between the pixels.

7. The display device according to claim 1, wherein a pixel formation period of the two sub-pixels and a colored layer formation period of the plurality of colored layers are shifted by a formation period of a single sub-pixel.

* * * * *